United States Patent [19]

Danner et al.

[11] Patent Number:
[45] Date of Patent: Sep. 29, 1987

[54] HYDROPHILIC CATIONIC COPOLYMERS OF ACRYLAMIDE OR METHACRYLAMIDE

[75] Inventors: Bernard Danner, Riedisheim, France; James R. Ruynon, Oberwil, Switzerland

[73] Assignee: Sandoz Ltd., Basel, Switzerland

[21] Appl. No.: 633,807

[22] Filed: Jul. 24, 1984

[30] Foreign Application Priority Data

Jul. 30, 1983 [DE] Fed. Rep. of Germany ....... 3327600

[51] Int. Cl.$^4$ .................................................. C08K 5/52
[52] U.S. Cl. ........................................ 524/140; 524/161; 524/166; 524/313; 524/555; 524/812; 524/815; 524/475
[58] Field of Search ............... 524/812, 815, 140, 161, 524/166, 313, 475

[56] References Cited

U.S. PATENT DOCUMENTS

| Re. 28,576 | 10/1975 | Anderson et al. | 260/29.6 H |
|---|---|---|---|
| 3,284,393 | 11/1966 | Vanderhoff et al. | 260/29.6 |
| 4,052,353 | 10/1977 | Scanley | 260/29.6 PM |
| 4,077,930 | 3/1978 | Lim et al. | 260/29.6 TA |
| 4,147,681 | 4/1979 | Lim et al. | 260/29.6 TA |
| 4,152,200 | 5/1979 | Coscia et al. | 260/29.6 WQ |
| 4,217,262 | 8/1980 | Coscia et al. | 260/29.6 WQ |
| 4,299,755 | 11/1981 | Keggenhoff et al. | 260/23 AR |
| 4,440,744 | 4/1984 | Strasilla et al. | 424/70 |
| 4,452,940 | 6/1984 | Rosen | 524/801 |
| 4,464,508 | 8/1984 | Easterly, Jr. | 524/801 |

OTHER PUBLICATIONS

Macromolecular Solutions, Seymour and Stahl, 1982, pp. 151–165.

Primary Examiner—Joseph L. Schofer
Assistant Examiner—T. M. Reddick
Attorney, Agent, or Firm—Gerald D. Sharkin; Richard E. Vila; Thomas C. Doyle

[57] ABSTRACT

A cationic polymer composition suitable for use as a flocculating agent and as a retention aid and dewatering agent in paper making consists of a mixture of
(a) a hydrophilic cationic polymer of
 ($a_1$) acrylamide and/or methacrylamide and
 ($a_2$) dialkylamino-$C_{2-3}$alkylene-(meth)acrylamide the molar quantity of cationic monomer units ($a_2$) being from 0.2 to 9 mol % of the total
(b) an anionic surfactant
(c) a water-immiscible oil in which the polymer (a) is insoluble, and
optionally (d) a lipophilic non-ionic surfactant,
optionally (e) water
and optionally (f) an oil-miscible polar solvent.
The compositions may be prepared by water-in-oil emulsion copolymerization and are readily diluted with water.

34 Claims, No Drawings

HYDROPHILIC CATIONIC COPOLYMERS OF ACRYLAMIDE OR METHACRYLAMIDE

The present invention relates to hydrophilic cationic acryl- or methacrylamide copolymers having a low cationicity, which are useful as flocculating agents, particularly as retention and dewatering agents in the paper industry.

It has now been found that, when prepared in the form of a water-in-oil emulsion, hydrophilic (meth)acrylamide/dialkylaminoalkylene-(meth)acrylamide copolymers having a low cationicity have good retention and dewatering properties. In addition such emulsions can easily be dispersed or dissolved in water.

Accordingly, the present invention provides a water-miscible composition comprising (a) a hydrophilic cationic copolymer of
  ($a_1$) acrylamide or methacrylamide or a mixture thereof, and
  ($a_2$) a cationic monomer of formula I or II

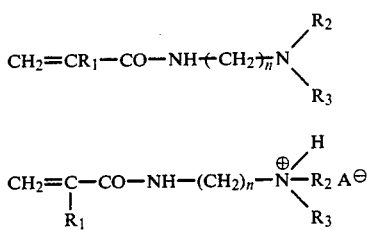

in which
$R_1$ is hydrogen or methyl,
each of $R_2$ and $R_3$, independently, is methyl or ethyl,
n is 2 or 3
and $A^\ominus$ is an anion or a mixture thereof,
  the molar quantity of cationic monomer units ($a_2$) being from 0.2 to 9 mol % of the total ($a_1$)+($a_2$),
(b) an anionic surfactant,
the molar quantity of (b) being not greater than the molar quantity of the cationic monomer units of ($a_2$), and the cationic monomer units ($a_2$) being at least partially converted to a salt form having as anion the anion of the anionic surfactant (b),
and (c) a water-immiscible oil in which the copolymer (a) is insoluble.

The copolymer (a) is free of anionic monomer components and is composed entirely of the non-ionic monomer units ($a_1$) and the cationic monomer units ($a_2$). Quaternary ammonium salts of units ($a_2$) are excluded.

Preferably $R_1$, $R_2$ and $R_3$ are all methyl. n is preferably 3. $A^\ominus$ may be any conventional anion, preferably a halide ion (particularly $Cl^\ominus$) or a sulphate anion. In a preferred form of the invention, however, $A^\ominus$ is $A_1^\ominus$ is the anion of the anionic surfactant (b).

In the copolymer (a), the molar quantity of cationic monomer units ($a_2$) is preferably from 1–8 mol %, more preferably 2–6 mol %, especially 2–5 mol % of the total.

The molecular weight (weight average MW) of the copolymer may be as high as desired, advantageously up to 20,000,000. The MW is preferably $\geq 500,000$, particularly $\geq 1,000,000$. More preferably the MW of the copolymer (a) is from 1,000,000 to 20,000,000.

The preferred copolymers may be structurally defined as random copolymers containing units of the following three types:

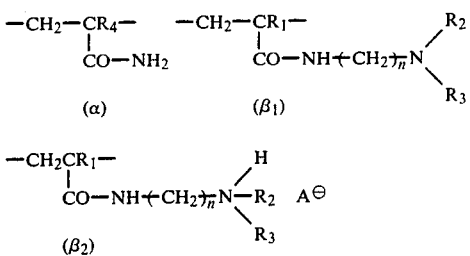

in which $R_1$, $R_2$, $R_3$, n and $A^\ominus$ are as defined above and $R_4$ is hydrogen or methyl, preferably hydrogen. In the presence of the anionic surfactant (b) and in the acidic medium, the cationic monomer units ($a_2$) have preferably the structure $\beta_2$ in which $A^\ominus$ is at least partially an anion $A^\ominus_1$.

The surfactant (b) may be any conventional surfactant having at least one lipophilic hydrocarbon residue and at least one hydrophilic anionic group. Suitable surfactants are described for example in "Surfactant Science Series" (M. Dekker Inc., New York and Basle), vol. 7; and "Anionic Surfactants" (ed. W. M. Linfield, 1976), parts 1 and 2. The lipophilic residue is preferably araliphatic or aliphatic and contains at least 9 carbon atoms, preferably 12–36 carbon atoms. The anionic group may be any conventional acid group, optionally in salt form, for example carboxylate, phosphate, phosphonate, sulphate and sulphonate, of which sulphonate is most preferred. The molecule may contain polyalkylene glycol ether groups, but these are preferably absent.

Preferred classes of anionic surfactants are: sulphated fatty acid mono- di- and trigylcerides, particularly sulphated natural fats or oils and sulphated monoglycerides; sulphated fatty alcohols; sulphated fatty acid alkanolamides; sulphonated hydrocarbons, particularly alkylsulphonates, olefin sulphonates and alkarylsulphonates, especially petroleum sulphonates; sulphonated aliphatic carboxylic acids and esters, particularly α-sulphomonocarboxylic acids and esters and alkyl sulphosuccinates; partial alkyl esters of phosphoric acid; aliphatic carboxylic acids (soaps); and carboxymethylation products of fatty alcohols, monoglycerides and fatty acid alkanolamides. Of the above, the sulphonates, particularly the sulphonated hydrocarbons, especially petroleum sulphonates are preferred.

It is preferred that the anionic surfactant is originally present at least partially in the form of a salt with a conventional cation, for example that of an alkali metal, e.g. lithium, sodium, potassium, alkaline earth metal such as magnesium, calcium, strontium or barium, $Zn^{2+}$, $Al^{3+}$, $Zr^{4+}$ and ammonium or substituted ammonium. Preferably it is in the form of a salt of a polyvalent inorganic cation, of which $Ca^{2+}$ is particularly preferred. Salts of the surfactant with a polyvalent metal or an amine may be prepared in situ by treating the alkali metal salt, e.g. sodium salt, of the surfactant with a water-soluble salt of the metal, for example the formate or chloride or with a water-soluble salt of the corresponding amine. In the case of calcium, calcium chloride is preferred.

The anionic surfactant may have a greater or lesser degree of water solubility or dispersability depending on their lipophilic residue and on their cation. Preferred anionic surfactants are lipophilic, and preferably are such that their sodium salts are oil-soluble. Especially preferred are those which in salt form (particularly the calcium salts) give no true solution in water, but act as W/O (water-in-oil) emulsifiers, particularly with the oils (c) defined below.

Component (c) may be a single oil or a mixture of oils, in which copolymer (a) is finely dispersed, and may be either natural or synthetic. Suitable oils include oils from refining crude petroleum, vegetable and animal oils, synthetic hydrocarbons, modified paraffins and fatty acid esters. Examples of these types include the following:

1. Hydrocarbons
   1.1. Hydrocarbons from petroleum refining, particularly
      1.1.1. petroleum spirit, b.p. 65°-140° C. (de-aromatised or aromaticcontaining)
      1.1.2. white spirits, paint thinners, etc., b.p. 100°-310° C., preferably 140°-300° C., especially those in Table I

TABLE I

| % aromatic content | b.p. °C. |
|---|---|
| aromatic-free | 100-270, preferably 140-250 |
| 12-19 | 160-210 |
| 24-45 | 140-310 |
| 80-90 | 160-260 |
| fully aromatic | 160-310 |

1.1.3. Isoparafins, b.p. 110°-260° C.
   1.1.4. Paraffin oil (=mineral oils, e.g. diesel oil, spindle oil, machine oil, cylinder oil, lubricating oil, medicinal paraffin oil)
   1.1.5. petrolatum (preferably mixed with an oil liquid at 20° C.)
   1.2. Synthetic hydrocarbons, particularly from Fischer-Tropsch synthesis or high pressure hydrogenation of carbon, e.g.

| synthetic petrol (gasoline) | b.p. 65-170° C. |
|---|---|
| Kogasin I | b.p. 190-230° C. |
| Kogasin II | b.p. 230-330° C. |
| synthetic paraffin oil | b.p. 300-450° C. |

1.3. Benzenes and alkylbenzenes e.g. toluene, xylene, and methylethyl-, trimethyl-, dimethylethyl-, tetramethyl- and higher ($C_{6-12}$)alkyl benzenes.
2. Natural vegetable or animal triglycerides, particularly olive oil, peanut oil, cottonseed oil, coconut fat, rape oil, sunflower oil, corn oil, castor oil and neats foot oil.
3. Fatty acid monoesters, primarily $C_{1-4}$alkyl esters of $C_{12-14}$, preferably $C_{14-24}$ fatty acids, particularly methy, butyl and isopropyl esters of stearic, oleic, palmitic and myristic acids and mixtures thereof.

Preferred oils are aromatic-free and low-aromatic hydrocarbons and aliphatic fatty acid esters, particularly hydrocarbons listed under 1.1.2., 1.1.3. and 1.1.4. above, especially aromatic-free and low aromatic white spirits, isoparaffin and mineral oils.

In one particular embodiment of the invention component (c) comprises a mixture of at least two oils, particularly a mixture of an oil ($c_1$) and an oil ($c_2$) chosen such that the oil/water required hydrophile/lipophile balance (O/W-RHLB) value of ($c_1$) is greater than that of the mixture of ($c_1$) and ($c_2$). The O/W-RHLB value of an oil is the optimum HLB-value of a hypothetical surfactant which is sufficient to produce stable O/W emulsion of that oil and water; see for example "Cosmetics, Science and Technology" Wiley, 2nd edition, volume 3, 1974, pp 602-7, or "Emulsion Science" P. Sherman, Academic Press, 1968 pp 146-7 or "Emulsion, Theory and Practice" P. Becher, Amer. Chem. Soc. Monograph series No. 162, 2nd edition, 1965.

Preferably the O/W-RHLB value of ($c_2$) is less than that of ($c_1$). Preferred oils ($c_1$) have O/W-RHLB values in the range 10-15; such oils include hydrocarbon oils listed under 1.1.1., 1.1.2., 1.1.3. and 1.3. above. Preferred oils ($c_2$) have O/W-RHLB values in the range 7-10; such oils include those listed under 1.1.4., 1.1.5., 2. and 3. above.

Preferably the compositions according to the invention contain, in additon to (a), (b) and (c).

(d) a lipophilic non-ionic surfactant.

Component (d) is preferably oil-soluble and may be a single surfactant or a mixture. Component (d) must function as a W/O (water-in-oil) emulsifier, that is, it must be capable of forming a W/O emulsion with at least part of the oil (c) in the presence of water. The surfactant (d) is preferably insoluble in water, and has an HLB value $\leq 8$, more preferably in the range 3-8, particularly in the range 4-7. If (d) is a mixture, these values apply to the average HLB value of the mixture.

Component (d) generally is one or more compounds having at least one lipophilic hydrocarbon residue of at least 9, preferably 9-24 carbon atoms and at least one non-ionic hydrophilic residue, which is preferably a mono- or polyethylene glycol group, optionally containing propylene glycol units, or the residue of a polyol e.g. glycerol, mannitol, pentaerythritol and sorbitol. Other suitable types include hydrophobic surfactants sold under the registered trademarks Pluronic and Tetronic in which the high propylene oxide content can be regarded as the lipophilic residue.

Specific types of non-ionic surfactants include: Products obtainable by addition of ethylene oxide (EO) and/or propylene oxide (PO) (preferably EO alone) to aliphatic alcohols, alkyl phenols, fatty acids, fatty acid alkanolamides, partial fatty acid esters of polyols; and vegetable or animal fats oils; partial fatty acid esters of polyols; EO/PO polymers with high PO content (Pluronic types); EO/PO addition products to ethylene diamine, having a high PO content (Tetronic types); diethers of mono- or polyethylene glycols with aliphatic alcohols and alkyl phenols; and diesters of mono- or polyethylene glycols with aliphatic fatty acids.

Partial fatty acid esters of polyols are preferably mono- and diesters and more preferably mono-esters of aliphatic polyols having 3 or more hydroxy groups, particularly a polyol such as glycerol, pentaerythritol, mannitol or sorbitol.

The preferred number of ethylene oxide units in addition products of EO to fatty alcohols and alkyl phenols is 1-6 and in addition products to fatty acids and in di-esters of polyalkylene glycol, the number of EO units is preferably 1-10. The numbers are average values and need not to be integral.

Fatty acid residues may be saturated or unsaturated (if unsaturated, preferably monoethylenically unsaturated) and are preferably acyl groups having 9-24, preferably 12-20, carbon atoms, particularly residues of lauric, myristic, stearic and oleic acids. If an alkyl group is the sole lipophilic group, it has preferably 9-24, more preferably 9-18, carbon atoms and may be straight chain or branched. In alkylaryl groups the alkyl group preferably has 4-12 carbon atoms and may also be straight or branched.

Particularly preferred surfactants are those of formula III–VI

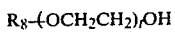

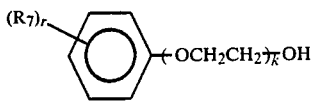    IV

    V

    VI in which
R$_7$ is C$_{4-12}$alkyl
R$_8$ is C$_{9-18}$alkyl or alkenyl
R$_9$CO is the acyl residue of an aliphatic C$_{12-18}$fatty acid
Y is the monovalent residue of sorbitol, glycerol, or di- to tetra-ethylene glycol
t is 2–3
k is 3–5
r is 1 or 2
and m if 4–9.

The HBL values of non-ionic surfactants may be calculated by use of a standard formula. In order to function as a W/O emulsifier in this system, the calculated HLB value must be greater than 2.5.

When the oil (c) is a mixture of oils (c$_1$) and (c$_2$) then the oil mixture and the surfactant (d) are preferably so chosen that the O/W-RHLB value of the oil mixture is as close as possible to the HLB value of (d), or at least is not less than this value.

Preferably th compositions according to the invention contain, in addition to components (a), (b), (c) and preferably (d),
(e) water.

The copolymer (a) and salts of the copolymer with surfactant (b) are hydrophilic and will take up water or form with water a gel or sol and in sufficient water will form a true or a colloidal solution. The quantity of water (e) is chosen so that the copolymer together with the water becomes finely dispersed in the oil. The dispersion may be in the form of a suspension of wet or water-swollen copolymer or of an aqueous copolymer gel in the oil, or an emulsion of an aqueous copolymer sol or copolymer solution in the oil.

In one particular aspect of the invention, the composition contains, in addition to components (a)–(c) preferably (d) and optionally (e),
(f) an oil-miscible polar solvent which is only slightly soluble in water, not self-dispersing in water, and which has an emulsifying properties of its own.

Suitable solvents (f) are compounds which have extremely low HLB values but whose molecules are polar enough to orientate themselves at the oil/water interface. Preferred solvents are C$_{5-10}$aliphatic alcohols and phosphoric acid triesters. Examples of suitable solvents include methyl-isobuty carbinol, 2-ethyl-hexanol, isononanol, isodecanol, 2,4,7,9-tetramethyl-5-decyn-4,7-diol, tributyl phosphate, tri-isobutyl phosphate, tri(butoxy-ethyl)phosphate and Pluronic L101.

Compositions according to the invention may be prepared by mixing surfactant (b) before, during or after the copolymerisation, with the copolymer (a) or the corresponding monomers in the presence of at least part of the oil (c), the copolymer or monomers being present in finely divided form.

It is advantageous to carry out the copolymerization in a W/O emulsion system and to have at least part of the anionic surfactant (b) present before polymerisation, or at least before addition of the cationic monomer (a$_2$).

According to a preferred embodiment of the invention, copolymer (a) is produced by W/O-emulsion copolymerisation of the corresponding monomers in the presence of surfactant (b). After copolymerisation water and/or a part of the oil (c) can if desired be removed by distillation, and optionally further additions of any of components (a)–(f) may be made.

Preferably the monomers are emulsified in the form of their aqueous solution in at least part of the oil (c) in the presence of the anionic surfactant (b) and preferably also in the presence of the lipophilic non-ionic surfactant (d). The cationic monomers (a$_2$) are present in a molar excess over the anionic surfactant (b). This W/O emulsion may be formed by adding the monomers to an already-formed W/O emulsion, or the monomers may be added to an aquoues solution or dispersion of the anionic surfactant (b), to which is then added the oil and optionally the non-ionic surfactant (d), or a solution of surfactant (b) and (d) in oil (c) may be added to an aqueous solution of the monomers.

The presence of the anionic surfactant in the monomer-containing W/O emulsion before copolymerisation enables part of the cationic monomers, particularly in netural to acid conditions, to form salts with the surfactant, which salts are less water-soluble and more lipophilic than the monomers themselves.

Copolymerisation is initiated by addition of a suitable catalyst.

An alternative method of preparing compositions according to the present invention consists in forming a dispersion containing polymer (a), water (e) and lipophilic non-ionic surfactant (d) in oil (c) in the absence of anionic surfactant (b), and then adding the anionic surfactant (b) to this dispersion. For this process variant, it is preferred that the anionic surfactant is an oil-soluble, practically water-insoluble sulphonated hydrocarbon, and that the oil is a water-non-miscible hydrocarbon oil, in which copolymer (a) and water are finely dispersed, particularly a hydrocarbon oil of the type listed under 1.1. above, preferably white spirit. Preferably the dispersion is obtained by emulsion polymerisation of the monomer solution in oil in the presence of surfactant (d) as emulsifier, and optionally partial removal of water by distillation.

The emulsion copolymerisation in the presence of anionic surfactant (b) may be carried out in conventional manner (see for example "High Polymers" vol. 9, 1955—"Emulsion Polymerisation, Interscience Publishers, N.Y.). Conventional free radical initiators are used to catalyse the polymerisation. Suitable initiator systems include peroxide compounds, e.g. t-butyl hydroperoxide, in combination with redox systems, e.g. ferric salts plus sodium thiosulphate. To sequester impurities, it is preferred to add a complexing agent such as salts of ethylenediaminetetraacetic acid (EDTA). The aqueous phase may contain further additives; e.g. acids, bases or buffer systems to regulate pH and salts e.g. sodium sulphate and calcium chloride.

The air above the emulsion is normally replaced by an inert gas and copolymerisation is started by the addition of initiator. The copolymerisation takes place for example at pH values between 2 and 6, preferably under acid conditions (pH 2.5-4). The water content of the W/O emulsion during copolymerisation is preferably 15-80 wt.%, more preferably 30-75 wt.% based on the total weight of the emulsion.

The copolymerisation is normally exothermic, and may be carried out under adiabatic or isothermal conditions, but preferably is carried out partially adiabatically, i.e. the temperature is allowed to increase within certain limits, e.g. up to 120° C., under pressure if necessary. Preferred reaction temperatures are from 30°-110° C. If the reaction mixture contains hydrolysable monomers, e.g. esters of primary amides, it is necessary to avoid reaction conditions under which significant amounts of hydrolysis would occur.

For the W/O emulsion copolymerisation it is advantageous to use an oil (c) comprising at least 50%, preferably at least 80% by wt. hydrocarbons, which should preferably be as completely aliphatic as possible. The concentration of monomers in the emulsion is not critical; good results are obtained when the concentration of monomers ($a_1 + a_2$) in the emulsion is from 5 to 35%, preferably 10 to 30% by weight. It is advantageous to have a water to oil weight ratio as high as possible to such an extent that the emulsion still remains of the W/O type. The water to oil ratio is preferably from 1.5 to 6, particularly from 1.8 to 4.8. The concentration of surfactant used is adjusted to be sufficient to give a stable W/O emulsion under the copolymerisation conditions.

After copolymerisation is complete the copolymer-containing W/O emulsion can be treated by addition of further quantities of components (a)-(f) or, if desired, the amount of components (c) and/or (e) can be reduced by distillation. By such adjustments properties of the emulsion such as stability and ease of dilution with water can be influenced and improved.

If component (f) is to be present, this is preferably added after the emulsion copolymerisation, more preferably after all other components have been added. It may be advantageous to mix (f) with a little oil (c) before addition.

If a mixture of oils ($c_1$) and ($c_2$) is to be used, the emulsion copolymerisation is preferably carried out either in the mixture or in ($c_1$) alone or in a mixture of ($c_1$) with less than all of the ($c_2$). The oil ($c_2$), or that part of it not already present, may be added after the emulsion copolymerisation, optionally after some or all of the water has been distilled off. With the emulsion copolymerisation process of the invention, it is possible to produce hydrophilic cationic copolymers having a large MW as already indicated, particularly copolymers having a MW within the upper range.

The relative weights of the various components in the compositions according to the invention may be represented as follows: for every 100 parts by weight of the copolymer (a), the composition contains x parts by weight of (b), y of (c), z of (d) u of (e) and v of (f). The figures 100 for (a) and x for (b) do not take into account the salt formation between (a) and (b); that is, the weight of surfactant which forms a salt with the copolymer is not counted as part of the polymer weight, but remains part of weight x.

The preferred ranges of x-v are set out in Table II below, the values for each component being independent of each other except where otherwise stated.

TABLE II

| component | value of | preferred | more preferred | most preferred |
|---|---|---|---|---|
| | | | (component a = 100) | |
| b | x | ≧0.002 | 0.002-15 | 0.005-10 |
| c | y | 30-400 | 30-400 | 40-300 |
| d | z | 1-80 | 1-80 | 2-35 |
| e | u | 0-600 | 1-600 | 2-500 |
| f | v | <y | 0-30 (<y/3) | 0-15 (<y/5) |

The water content (u) can vary within wide limits and in theory it is possible to remove the water completely by distillation giving u=0. In practive it is difficult to remove the last traces of water from the polymer; also it is possible to add water in the form of a further amount of W/O emulsion or aqueous copolymer solution; so that the water content of the composition can be high. As it is not economically feasible to remove all the water, u can preferably be 5-600, more preferably 10-500.

Preferred compositions contain, for 100 parts by weight of (a), 0.002-15 parts (b), 30-400 parts (c), 1-80 parts (d), 1-600 parts (e) and 0-30 parts (f) where the weight of (f) is less than ⅓ that of (c).

Particularly preferred compositions are those in which the weight of each component present is within the range given in the "most preferred" column of Table II.

The oil-containing composition according to the invention are dispersions which may slow a wide range of viscocities. The Brookfield rotation viscosity (measured in a LV-viscometer) may vary between 5 cp (spindle no. 2) and 10,000 cp (spindle no. 4), preferably between 50 cp (spindle no. 2) and 5000 cp (spindle no. 4). The dispersions are stable and can be stored for long periods of time without change or, if separation into two layers occurs, can be restored to the original form by simple stirring.

The compositions of the invention, particularly those containing the oil (c) have particularly good dispersability in water and can rapidly be diluted with water by stirring or by the use of conventional dilution apparatus, e.g. as disclosed in U.S. Ser. No. 462,814, now abandoned.

In a preferred method of dilution, the dispersion is pumped through a nozzle into a stream of water which surrounds the nozzle. The water stream has a higher velocity than that of the stream of dispersion, and this velocity is sufficient to overcome at least partially the internal adhesive and cohesive forces in the dispersion, but not sufficient to reduce the size of the polymer molecules. The mixture of product and water is then alternatively accelerated in narrow tubes and decelerated in wider mixing zones until the desired degree of mixing is obtained. No sieves or filters are used in this process from the time the stream of water and dispersion contact each other.

The compositions according to the invention can be very rapidly diluted with water and thus are suitable for use in many large-scale continuous processes, in which cationic polymers are used. By the use of a mixer system as described above, fully diluted solutions or dispersions can be obtained without the use of any dwell tanks; the mixer can simply be connected up to the equipment in which the diluted product will be used. The compositions of the invention can also be easily diluted with hard water, e.g. hard water 20° d.H.

The compositions may contain very high concentrations of cationic polymer, enabling the minimum handling of bulk liquids. Concentrated compositions may advantageously contain at least 10% by weight copolymer (a).

Not only the concentrated compositions described above, but also partially diluted compositions containing at least 0.001% by weight of copolymer (a), more preferably at least 0.1% by weight of (a) are included within the scope of the present invention. The partially diluted compositions may be further diluted as required before use.

The compositions of the invention are useful as flocculating agents, particularly as retention and dewatering agents in papermaking and as flocculating agents for aqueous sludge, particularly crude and treated sludge from sewage purification works. They may also be used in other processes where cationic polymers are employed. They can be used in acid and neutral ranges.

The compositions of the invention have good retention and dewatering properties and are particularly suitable for making paper and cardboard. They give a particularly homogeneous sheet formation.

Compared with compositions containing copolymers having a higher cationic monomer content, the compositions of the invention are easier to polymerize and require less surfactants. Stable compositions with low viscosity and containing copolymers with higher MW may thus be obtained.

The following Examples illustrate the invention: all parts and percentages are by weight unless otherwise stated.

EXAMPLES

Emulsifiers used:
b': sodium salt of petroleum monosulphonate, MW 440–470 (62% solution in mineral oil)
d': $C_{12}H_{25}$ $(OCH_2CH_2)_2OH$, HLB=6.5
d'': sorbitol monooleate, HLB=4.0
d''': $C_{18}H_{35}$ $(O-CH_2CH_2)_3$ OH, HLB=6.5

Oils used:
c'' white spirit: aromatic-free, b.p. 193° to 247° C., mean MW 173
c'' isoparaffin: b.p. 210°–260° C., aniline point 88° C., isoparaffin content 80%, SG=0.78

EXAMPLE 1

16 Parts emulsifier b' are mixed with 1200 parts water, giving a very fine opalescent emulsion. On addition of 8 parts calcium chloride, a precipitate of the water-insoluble (oil-soluble) calcium sulphonate salt of b' is formed. Finally 408 parts white spirit c' is added with stirring, giving a water-in-oil emulsion which is stabilised by addition of 27 parts emulsifier d'. To this emulsion is added in the following order 120 parts of 50% aqueous N,N-dimethylaminopropylmethacrylamide hydrochloride, 454 parts acrylamide, 1.4 parts EDTA disodium salt, 0.7 parts ferric sulphate and 0.7 parts of t-butylhydroperoxide, after which the pH of the aqueous phase if 3.0. The emulsion is heated to 35° C. under nitrogen, and an air-free solution of 2.7 parts sodium thiosulphate in 50 parts water is added dropwise over 8 hours, the temperaure being kept at 35°–50° C. by cooling.

Polymerisation is complete when all the thiosulphate solution has been added. A stable, fine dispersion of polymer is obtained, of Brookfield viscosity 1000 cp (spindle 3, 50 rpm). The product is very easily diluted with water, the maximum viscosity of a 0.5% aqueous dilution with cold water being reached after only 30–40 seconds. The viscosity of a freshly-prepared 1% aqueous dilution is approx. 500 cp (Brookfield, spindle 3, 60 rpm).

EXAMPLE 2

97 Parts acrylamide, 28 parts of 50% aqueous N,N-dimethylaminopropylmethacrylamide hydrochloride, 376 parts water and 1 part EDTA disodium salt are introduced in a 1500 part (volume) flask. After dissolution, the pH is adjusted to 3.0 with hydrochloric acid while stirring. Then a solution of 8 parts emulsifier b', 9 parts emulsifier d' and 202 parts white spirit c' is added with vigorous stirring. A fine milky emulsion is formed, which is thoroughly de-aerated three times under approx. 20 mbars and stirred while bubbling a stream of nitrogen through the mixture. Polymerisation is carried out under a stream of nitrogen. The reaction mixture is heated to 50° and a solution of 0.4 parts $\alpha,\alpha'$-azoisobutyronitril in 4 parts acetone is added under a strong nitrogen stream. Polymerisation is carried out at 50 to 55° C. over 3 hours. After approx. 30 minutes, the emulsion becomes viscous and slightly exothermic so that heating can be stopped for about half an hour. After the 3 hour reaction, a liquid product is obtained having a Brookfield viscosity of 250 cp (spindle 4, 50 rmp).

EXAMPLE 3 4 Parts emulsifier b' are mixed with 478 parts water, giving a very fine opalescent emulsion. The calcium salt of the emulsifier b' is formed by addition of 0.75 parts calcium chloride. To this mixture is added 97 parts acrylamide, 28 parts of 50% aqueous N,N-dimethylaminopropylmethacrylamide hydrochlride and 1 part EDTA disodium salt. After dissolution, the pH is adjusted to 3.0 with hydrochloric acid while stirring. To the resulting monomer solution is added with vigorous stirring a solution of 9 parts emulsifier d' in 202 parts white spirit c'. A fine milky emulsion is formed, which is thoroughly de-aerated three times under approx. 20 mbars and stirred while bubbling a stream of nitrogen through the mixture. For polymerisation which is carried out under a nitrogen stream, the mixture is heated to 50° C. and a solution of 0.4 parts $\alpha,\alpha$-azoisobutyronitril in 4 parts acetone is added, the stream of nitrogen being increased for the time of addition. Polymerisation is carried out at 50° to 55° C. over 3 hours. After approx. ½ hour the emulsion becomes viscous and slightly exothermic so that heating can be removed for about half an hour. After 3 hour polymerisation, a liquid product is obtained with a Brookfield viscosity of 350 cp (spindle 4, 50 rpm).

The procedures of Examples 1 to 3 are repeated using the following ingredients:

EXAMPLE 4

| | | |
|---|---|---|
| 96,5 | parts | acrylamide |
| 11,5 | parts | N,N—diamethylaminopropylmethacrylamide |
| 1 | part | EDTA di-sodium salt |
| 0,75 | parts | calcium chloride |
| 3,3 | parts | (volume) sulphuric acid |
| 14 | parts | emulsifier (d') |
| 206 | parts | colourless white spirit (c') |
| 4 | parts | emulsifier (b') |
| 0,4 | parts | azo-isobutyronitrile in 4 parts (volume) acetone |

-continued

| 402,4 parts | water |

EXAMPLE 5

| 103,3 parts | acrylamide |
| 15 parts | of 50% aqueous N,N—dimethylaminopropylmethacrylamide hydrochloride |
| 1 part | EDTA disodium salt |
| 0,75 parts | calcium chloride |
| 1,3 parts | (volume) HCl 1N |
| 27 parts | emulsifier (d') |
| 110 parts | white spirit (c') |
| 4 parts | emulsifier (b') |
| 0,4 parts | azoisobutyronitrile in 2 parts (volume) chloroform |
| 478 parts | water |

The viscosity of a freshly-prepared 1% aqueous dilution is approx. 350 cp (Brookfield, spindle 4, 100 rpm). The average molecular weight $M_N$ (numerical) is $2.1 \times 10^6$ and $M_W$ (weight) is $10.5 \times 10^6$.

EXAMPLE 6

| 96,5 parts | acrylamide |
| 48,0 parts | of 50% aqueous N,N—dimethylaminopropylmethacrylamide hydrochloride |
| 1 part | EDTA disodium salt |
| 0,75 parts | calcium chloride |
| 3,3 parts | (volume) $H_2SO_4$ 1N |
| 7 parts | emulsifier (d') |
| 6 parts | emulsifier (d") |
| 220 parts | white spirit (c') |
| 4 parts | emulsifier (b') |
| 0,4 parts | azoisobutyronitrile in 4 parts (volume) acetone |
| 380,4 parts | water |

EXAMPLE 7

| 107,7 parts | acrylamide |
| 6,3 parts | of 50% aqueous N,N—dimethylaminopropylmethacrylamide hydrochloride |
| 1 part | EDTA disodium salt |
| 0,75 parts | calcium chloride |
| 1,75 parts | (volume) HCl 1N |
| 27 parts | emulsifier (d') |
| 110 parts | white spirit (c') |
| 4 parts | emulsifier (b') |
| 4,0 parts | azoisobutyronitrile in 2 parts (volume) chloroform |
| 484,5 parts | water |

EXAMPLE 8

| 96,8 parts | acrylamide |
| 28,0 parts | of 50% aqueous N,N—dimethylaminopropylmethacrylamide hydrochloride |
| 1 part | EDTA disodium salt |
| 0,75 parts | calcium chloride |
| 1,8 parts | (volume) HCl 1N |
| 14 parts | emulsifier (d') |
| 206 parts | white spirit (c') |
| 4 parts | emulsifier (b') |
| 0,4 parts | azoisobutyronitrile in 4 parts (volume) chloroform |
| 386,7 parts | water |

The viscosity of a freshly-prepared 1% aqueous dilution is approx. 200 cp (Brookfield, spindle 4, 100 rpm), $M_N$ is $2.4 \times 10^6$ and $M_W$ is $8.9 \times 10^6$.

EXAMPLE 9

| 110 parts | acrylamide |
| 0,53 parts | N,N—dimethylaminopropylmethacrylamide |
| 1 part | EDTA disodium salt |
| 0,20 parts | calcium chloride |
| 1 part | (volume) HCl 1N |
| 6 parts | emulsifier (d''') |
| 14 parts | emulsifier (d') |
| 110 parts | white spirit (c') |
| 1 part | emulsifier (b') |
| 0,4 parts | azoisobutyronitrile in 4 parts (volume) acetone |
| 485 parts | water |

EXAMPLE 10

| 96,5 parts | acrylamide |
| 48,0 parts | of 50% aqueous N,N—dimethylaminopropylmethacrylamide hydrochloride |
| 1 part | EDTA disodium salt |
| 0,75 parts | calcium chloride |
| 3,3 parts | (volume) $H_2SO_4$ 1N |
| 9 parts | emulsifier (d') |
| 9 parts | emulsifier (d") |
| 220 parts | white spirit (c') |
| 4 parts | emulsifier (b') |
| 0,4 parts | azoisobutyronitrile in 4 parts (volume) acetone |
| 380,4 parts | water |

The viscosity of a freshly-prepared 1% aqueous dilution is approx. 60 cp (Brookfield, spindle 4, 100 rpm); $M_W = 1.7 \times 10^6$; $M_W = 11.4 \times 10^6$.

EXAMPLE 11

| 131,0 parts | acrylamide |
| 15,6 parts | N,N—dimethylaminopropylmethacrylamide |
| 0,2 parts | EDTA disodium salt |
| 0,75 parts | calcium chloride |
| 10,6 parts | (volume) 30% HCl |
| 20,3 parts | emulsifier (d') |
| 87,5 parts | white spirit (c') |
| 101,9 parts | isoparaffin (c") |
| 3,8 parts | emulsifier (b') |
| 0,04 parts | 2'-azo-bis(2-amidinopropane)dihydrochloride in 5 parts water |
| 623,4 parts | water. |

The viscosity of a freshly-prepared 1% aqueous dilution is approx. 130 cp (Brookfield, spindle 4, 100 rpm); $M_N = 2.2 \times 10^6$; $M_W = 9.9 \times 10^6$.

Application Example A

A 1.5% aqueous paper slurry of the following composition is prepared: 70 parts bleached wood pulp, 30 parts bleached sulphide pulp and 15 parts kaolin.

250 ml of this slurry are mixed with 1% based on wood and sulphite pulp amount of a commerically available synthetic size emulsion (emulsion of a dimeric alkyl ketone) and then with 5.0 ml of a 0.05% aqueous stock dilution of the product of Example 8 and 750 ml water. After stirring 5 sec. at 250 rpm the mixture is poured into 3 l of water in the filling chamber of a Rapid-Köthen sheet former, and after a 20 sec. pause the suction valve is operated to form the sheet.

A homogeneous sheet is obtained with a high filler retention. By following the same procedure but using 20 ml of the 0.05% aqueous stock dilution of the product of Example 8, a homogeneous sheet with a higher filler retention is obtained.

The products of Examples 1 to 7 and 9 to 11 may be used in analogous manner to Application Example A.

Application Example B 125 ml of a 1.5% aqueous paper slurry having the same composition as given in Example A are mixed with 875 ml water containing 5.0 ml of a 0.05% aqueous stock dilution of the product of Example 5 directly before (about 20 sec) the test and the mixture is dewatered on a Schopper-Riegler apparatus.

A homogeneous sheet is obtained with rapid and good water extraction. By following the same procedure but using 20 ml of the 0.05% aqueous stock dilution of the product of Example 5, a homogeneous sheet is obtained with a shorter dewatering time.

The products of Examples 1 to 4 and 6 to 11 may be used in analogous manner to Application Example B.

Application Example C

To 133 g of a sewage suspension from a communal sewage work in a graduated zylinder are added 40 ml of a 0.2% aqueous solution of the product of Example 8, and then the mixture is gravity filtered through an Orlon (Registered Trade Mark) cloth filter (diameter 9 cm). Water extraction of the sewage suspension takes place in a very short time.

The products of Examples 1-7 and 9-11 may be used in analogous manner to Application Example C.

Application Example D

A 1% aqueous paper slurry of the following composition is prepared: 100 parts bleached sulphite pulp and 20 parts calcium carbonate.

250 ml of this slurry are mixed with 1% based on the sulphite pulp amount of a commerically available synthetic size emulsion (emulsion of a dimeric alkylketene) and then with 2.5 ml of a 0.05% aqueous stock dilution of the product of Example 8 and 750 ml water. After stirring 5 sec. at 250 rpm the mixture is poured into 3 l of water in the filling chamber of a Rapid-Köthen sheet former, and after a 20 sec. pause the suction valve is operated to form the sheet.

The homogeneous sheet is obtained with a high filler retention. By following the same procedure but using 5.0 ml, 7.5 ml or 10.0 ml of the 0.05% aqueous stock dilution of the product of Example 8, a homogeneous sheet is obtained with increasing filler retention.

The products of Examples 1-7 and 9-11 may be used in analogous manner to Application Example D.

Application Example E

A 2% aqueous paper slurry of the following composition is prepared: 100 parts bleached sulphite pulp, 20 parts kaolin, 3 parts resin size, 2 parts aluminium sulphate.

Four samples (250 ml) of this slurry are mixed with 5, 10, 15 and 20 ml respectively of a 0.0125% aqueous stock dilution of the product of Example 8 and 750 ml water. After stirring 5 sec. at 250 rpm, each mixture is poured into 3 l of water in the filling chamber of a Rapid-Köthen sheet former, and after a 20 sec. pause the suction valve is operated to form the sheet. After drying and conditioning the paper sheet is incinerated and the ash content measured and calculated as a percentage of the weight of filler which was used, giving the % retention.

In each case a homogeneous sheet is obtained with a high filler retention. The % retention is increasing with the amount of product.

The products of Examples 1-7 and 9-11 may be used in analogous manner to Application Example E.

What is claimed is:

1. A water-miscible composition comprising
(a) a hydrophilic cationic copolymer of
  ($a_1$) acrylamide or methacrylamide or a mixture thereof, and
  ($a_2$) a cationic monomer of formula I or II

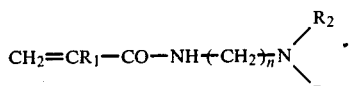

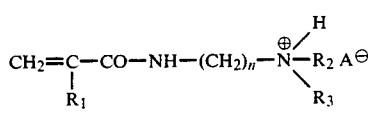

in which
$R_1$ is hydrogen or methyl,
each of $R_2$ and $R_3$, independently, is methyl or ethyl,
n is 2 or 3
and $A^{\ominus}$ is an anion,
or mixture thereof, the molar quantity of cationic monomer units ($a_2$) being from 0.2 to 9 mol % of the total ($a_a$)+($a_2$) and said copolymer being free of anionic monomer components,
(b) an anionic sulphonated hydrocarbon surfactant in the form of a salt which does not give a true solution in water, the molar quantity of (b) being not greater than the molar quantity of the cationic monomer units of ($a_2$), and the cationic monomer units ($a_2$) being at least partially converted to a salt form having as anion the anion of the anionic surfactant (b), and
(c) a water-immiscible oil in which the copolymer (a) is insoluble.

2. A composition according to claim 1, in which component (b) is initially present in calcium salt form.

3. A composition according to claim 1 in which the oil (c) is selected from aromatic-free and low-aromatic hydrocarbons and aliphatic fatty acid esters.

4. A composition according to claim 1 in which component (c) comprises a mixture of at least two oils, ($c_1$) and ($c_2$) chosen such that the oil/water required hydrophile/lipophile balance (O/W-RHLB) value of ($c_1$) is greater than that of the mixture of ($c_1$) and ($c_2$).

5. A composition according to claim 1 comprising, in addition to (a), (b) and (c),
(d) a lipophilic non-ionic surfactant.

6. A composition according to claim 5 in which (d) is either (i) one or more compounds having at least one lipophilic hydrocarbon residue of at least 9 carbon atoms and at least one non-ionic hydrophilic residue, which is either a mono- or polyethylene glycol group, optionally containing propylene glycol units, or the residue of a polyol or (ii) one or more hydrophobic Pluronic or Tetronic surfactants having a high propylene oxide content.

7. A composition according to claim 1 containing, in addition to components (a), (b) and (c), (e) water.

8. A composition according to claim 1 containing, in addition to components (a), (b) and (c), (f) an oil-miscible polar solvent which is only slightly soluble in water, not self-dispersing water, and which has no emulsifying properties of its own.

9. A composition according to claim 8 in which component (f) is selected from $C_{5-10}$ aliphatic alcohols and phosphoric acid triesters.

10. A composition according to claim 5 having the composition, for every 100 parts by wt. of component (a); 0.002 to 15 parts (b), 30 to 400 parts (c), 1 to 80 parts of a lipophilic non-ionic surfactant (d), 1 to 600 parts water (e) and 0 to 30 parts of an oil-miscible polar solvent (f) which is only slightly soluble in water, not self-dispersing in water, and which has no emulsifying properties of its own, but which reduces the water/oil interfacial surface tension, the weight of (f) being less than ⅓ that of (c).

11. A composition according to claim 1, containing at least 10% by weight of copolymer (a).

12. A process for the preparation of a composition as claimed in claim 1, comprising the steps of mixing component (b), before, during or after the copolymerisation, with copolymer (a) or the corresponding monomers in the presence of at least part of the oil (c).

13. A process according to claim 12 in which a water-in-oil emulsion containing the water-soluble monomers $(a_1)$ and $(a_2)$ in the aqueous phase emulsified in at least part of the oil (c) is polymerised in the presence of component (b).

14. A composition according to claim 1 wherein the molar quantity of cationic monomer units $(a_2)$ is from 2 to 6 mol % of the total $(a_1)+(a_2)$.

15. A composition according to claim 1 wherein the molecular weight of copolymer (a) is in the range 500,000 to 20,000,000.

16. A composition according to claim 1 wherein, in formulae I and II, $R_1$, $R_2$ and $R_3$ are methyl and n is 3.

17. A composition according to claim 1 wherein the anionic surfactant (b) comprises at least one araliphatic or aliphatic lipophilic residue containing at least 9 carbon atoms.

18. A composition according to claim 1 wherein component (c) is selected from the group consisting of hydrocarbons, natural vegetable and animal triglycerides and fatty acid monoesters.

19. A composition according to claim 4 wherein component (c) is an aromatic-free or low-aromatic hydrocarbon or an aliphatic fatty acid ester.

20. A composition according to claim 5, in which (d) is an addittion product of ethylene oxide and/or propylene oxide to a compound selected from aliphatic alcohols, alkyl phenols, fatty acids, fatty acid alkanolamides, partial fatty acid esters of polyols, and vegetable and animal fats and oils; a partial fatty acid ester of a polyol; a diether of a mono- or polyethylene glycol with an aliphatic alcohol or alkylphenol; or a diester of a mono- or polyethylene glycol with an aliphatic fatty acid.

21. A composition according to claim 5 wherein component (d) is a compound of formula III, IV, V or VI $$R_8\text{---}(OCH_2CH_2)_tOH \quad \text{III}$$

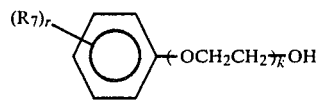

$$R_9\text{---}CO\text{---}Y \quad \text{V}$$

$$R_9\text{---}CO\text{---}O\text{---}CH_2CH_2O)_mCOR_9 \quad \text{VI}$$

in which $R_7$ is $C_{4-12}$alkyl, $R_8$ is $C_{9-18}$alkyl or alkenyl, $R_9CO$ is the acyl residue of an aliphatic $C_{12-18}$fatty acid, Y is the monovalent residue of sorbitol, glycerol, or di-, tri- or tetra-ethylene glycol, t is 2–3, K is 3–5, r is 1 or 2 and m is 4–9.

22. A composition according to claim 19 wherein, in cationic copolymer (a), the molar quantity of cationic monomer units $(a_2)$ is from 2 to 6 mol % of the total of $(a_1)+(a_2)$ and component (c) is an aromatic-free or low-aromatic hydrocarbon, an aliphatic fatty acid monoester or a mixture thereof, and which further comprises (d) a lipophilic non-ionic surfactant and (e) water.

23. A composition according to claim 22 wherein the cationic copolymer (a) has a molecular weight in the range 1,000,000 to 20,000,000.

24. A composition according to claim 22 wherein component (c) is an aromatic-free or low-aromatic hydrocarbon or mixture of at least two such hydrocarbons $(c_1)$ and $(c_2)$ chosen such that the oil/water required hydrophile/lipophile balance value of $(c_1)$ is greater than that of the mixture of $(c_1)$ and $(c_2)$.

25. A composition according to claim 24 wherein the cationic copolymer (a) has a molecular weight in the range 1,000,000 to 20,000,000.

26. A composition according to claim 24 wherein component (d) is an addition product of ethylene oxide and/or propylene oxide to a compound selected from aliphatic alcohols, alkyl phenols, fatty acids, fatty acid alkanolamides, partial fatty acid esters of polyols, and vegetable and animal fats and oils; a partial fatty acid ester of a polyol; a diether of a mono- or polyethylene glycol with an aliphatic alcohol or alkylphenol; or a diester of a mono- or polyethylene glycol with an aliphatic fatty acid.

27. A composition according to claim 24 wherein component (d) is a compound of formula III, IV, V or VI $$R_8\text{---}(OCH_2CH_2)_tOH \quad \text{III}$$

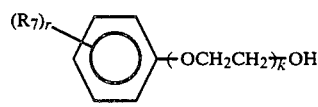

$$R_9\text{---}CO\text{---}Y \quad \text{V}$$

$$R_9\text{---}CO\text{---}O\text{---}(CH_2CH_2O)_mCOR_9 \quad \text{VI}$$

in which $R_7$ is $C_{4-12}$alkyl, $R_8$ is $C_{9-19}$alkyl or alkenyl,

R₉CO is the acyl residue of an aliphatic $C_{12-18}$ fatty acid,

Y is the monovalent residue of sorbitol, glycerol, or di-, tri- or tetra-ethylene glycol, t is 2–3, k is 3–5, r is 1 or 2 and m is 4–9, said compound having an HLB value in the range 4–7.

28. A composition according to claim 27 wherein component (b) is a petroleum sulphonate and component (c) is selected from the group consisting of aromatic-free and low-aromatic white spirits, isoparaffin, mineral oils and mixtures thereof, and, in copolymer (a), the molar quantity of cationic monomer units ($a_2$) is 2–5 mol % of the total ($a_1$)+($a_2$).

29. A composition according to claim 28 wherein the cationic copolymer (a) has a molecular weight in the range 1,000,000 to 20,000,000.

30. A composition according to claim 24 having the composition, for every 100 parts by wt. of component (a); 0.002 to 15 parts (b), 30 to 400 parts (c), 1 to 80 parts of a lipophilic non-ionic surfactant (d), 1 to 600 parts water (e) and 0 to 30 parts of an oil-miscible polar solvent (f) which is only slightly soluble in water, not self-dispersing in water, and which has no emulsifying properties of its own, the weight of (f) being less then ⅓ that of (c).

31. A composition according to claim 28 having the composition, for every 100 parts by wt. of component (a); 0.002 to 15 parts (b), 30 to 400 parts (c), 1 to 80 parts of a lipophilic non-ionic surfactant (d), 1 to 600 parts water (e) and 0 to 30 parts of an oil-miscible polar solvent (f) which is only slightly soluble in water, not self-dispersing in water, and which has no emulsifying properties of its own, the weight of (f) being less than ⅓ that of (c).

32. A composition according to claim 1 wherein anionic surfactant (b) is in the form of a salt of a polyvalent inorganic cation.

33. A composition according to claim 1 wherein copolymer (a) is a random copolymer containing units of the following three types:

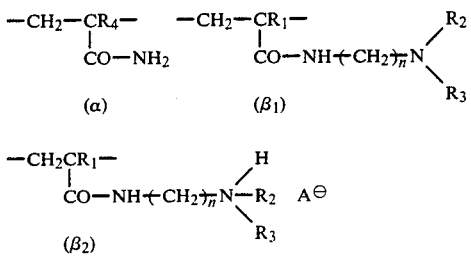

in which $R_1$, $R_2$, $R_3$, and $A^\ominus$ are as defined in claim 1 and $R_4$ is hydrogen or methyl.

34. A composition according to claim 33 in which the copolymer (a) is a random copolymer containing units of formulae ($\alpha$) and ($\beta_2$) wherein $A^\ominus$ is at least partially $A_1^\ominus$ where $A_1^\ominus$ is the anion of the anionic surfactant (b).

* * * * *